United States Patent
Chin et al.

(10) Patent No.: US 6,230,025 B1
(45) Date of Patent: May 8, 2001

(54) SYSTEM AND METHOD FOR SELECTIVELY DISTRIBUTING PARAMETERS IN A MOBILE COMMUNICATION NETWORK

(75) Inventors: Mary Wonmon Chin, Westmont, IL (US); Michael Antwong Garner, Roswell, GA (US)

(73) Assignee: Lucent Technologies, Inc., Murray Hill, NJ (US)

(*) Notice: Subject to any disclaimer, the term of this patent is extended or adjusted under 35 U.S.C. 154(b) by 0 days.

(21) Appl. No.: 09/131,232

(22) Filed: Aug. 7, 1998

(51) Int. Cl.[7] ...................................................... H04B 1/38
(52) U.S. Cl. ................................. 455/560; 455/422
(58) Field of Search ..................................... 455/560, 561, 455/552, 419, 418, 412, 414, 466, 422

(56) References Cited

U.S. PATENT DOCUMENTS

| | | | |
|---|---|---|---|
| 5,583,913 | * 12/1996 | Taketsugu | 455/560 |
| 5,724,664 | * 3/1998 | Lantto | 455/560 |
| 5,884,144 | * 3/1999 | Chavez, Jr. et al. | 455/560 |
| 5,933,784 | * 8/1999 | Gallagher et al. | 455/552 |

* cited by examiner

Primary Examiner—Nay Maung
Assistant Examiner—Quochien B. Vuong

(57) ABSTRACT

A system and method are provided for selectively distributing a parameter with a selected feature from one mobile switch center to another mobile switch center. A master control file is provided and downloaded to the one mobile switch center with instructions identifying parameters to be excluded from transmission. The instructions are implemented via a filter file program.

22 Claims, 2 Drawing Sheets

| PARAMETER I.D. | 0: DO NOT SEND 1: DO NOT SEND TO MSC SHOWN | MOBILE SWITCH CENTERS EXCLUDED FROM RECEIVING PARAMETER | | | |
|---|---|---|---|---|---|
| X | 0 | | | | |
| Y | 1 | A | C | D | E |
| Z | 1 | D | E | F | G |

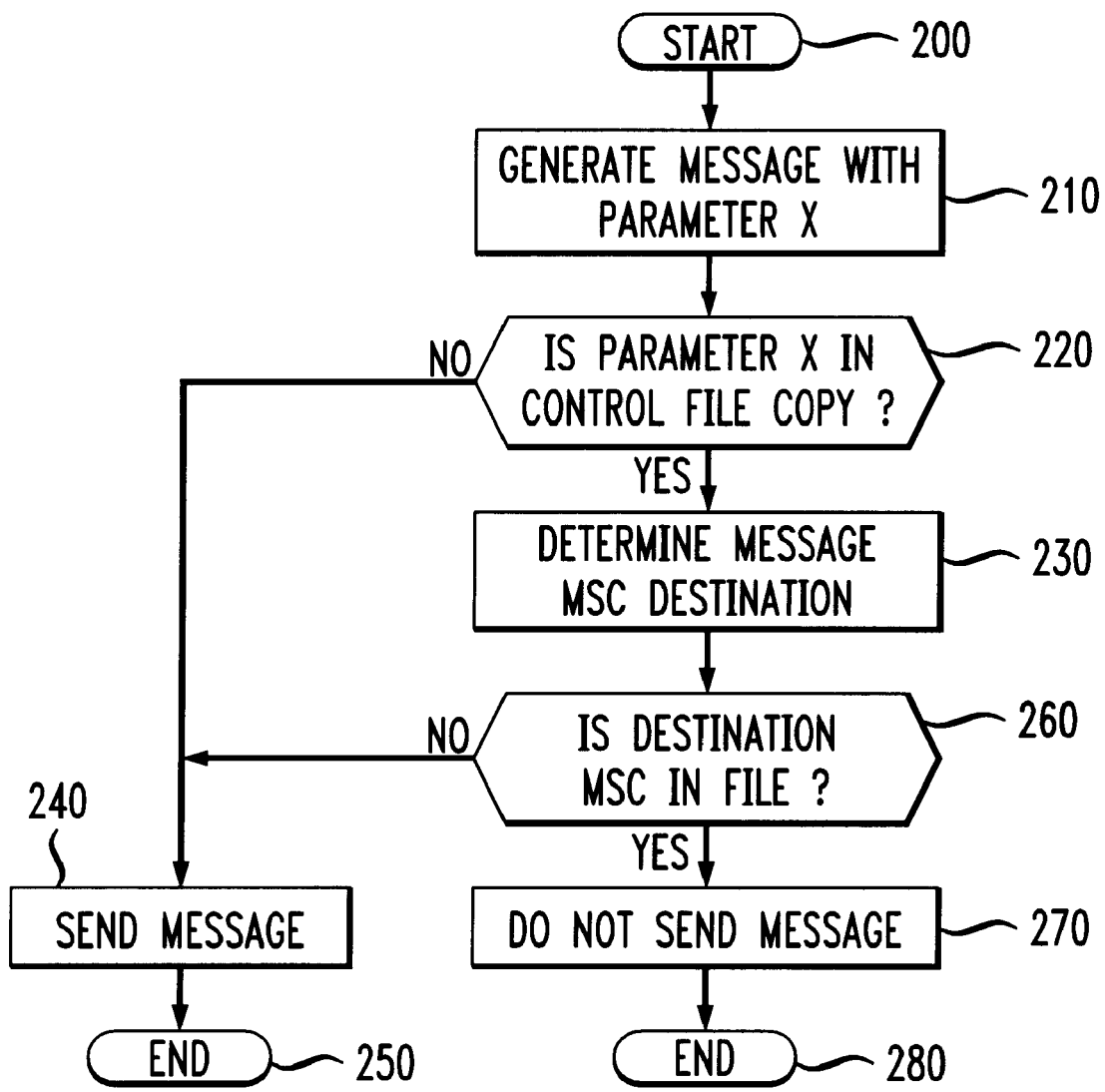

SYSTEM AND METHOD FOR SELECTIVELY DISTRIBUTING PARAMETERS IN A MOBILE COMMUNICATION NETWORK

BACKGROUND OF THE INVENTION

This invention pertains to the distribution of telephonic features among mobile switch centers (MSCs).

Wireless intersystem communications in the telephony industry comply with ANSI41 which is the industry standard for wireless radio communications intersystem operations. The ANSI41 standard is adopted and recognized by the American National Standards Institute and is published by the Telecommunications Industry Association/Electronics Industry Association TR-45.2 subcommittee, the disclosure of which is incorporated by reference.

In a wireless network having a plurality of MSCs acting as nodes in the network, the telephonic features that are defined by parameters in a message are transmitted among the MSCs in accordance with the ANSI41 standard. Compliance with the ANSI41 Standard requires that forward and backward compatibility exist for messaging among the MSCs and nodes in a telephonic network. Thus, even though an MSC does not provide a feature defined by a parameter in a message, the ANSI41 Standard provides that the parameter supporting that feature be disregarded or ignored by the MSC not providing the feature and that the operation/call be handled in accordance with the ANSI41 Standard in all other respects.

In practice, wireless telephonic networks include MSCs supplied by many different vendors. If one MSC fails to comply with ANSI41 regarding the processing of an operation/call including a parameter having a feature not provided by the MSC then degradation of the processing of the operation/call occurs including a total failure to establish the call.

Currently, extensive preliminary testing is done to determine if a feature is going to encounter a problem messaging among the MSCs in a telephonic network. When a MSC is identified as not complying with the ANSI41 Standard, expensive and time consuming software fixes are implemented to overcome the problem. Then if the noncompliance is corrected, the software fixes are undone with a corresponding expense and time.

Telephonic features are proliferating, and the benefits of features such as caller ID, call waiting and call forwarding are universally recognized. The innovators and providers of such features are inhibited to offer a new feature because MSCs in the network that do not offer the feature and fail to comply with the ANSI41 Standard will not properly process a operation/call which includes a parameter associated with a new feature. Accordingly, the innovators and providers of new features are impeded from developing and distributing and test marketing new features and obtaining the revenues associated with the new features. Ultimately, the benefits derived by the consumer from new features are jeopardized.

The present invention is directed to overcoming, or at least reducing the effects of one or more of the problems set forth above.

SUMMARY OF THE INVENTION

A system and method are provided in accordance with the invention for distributing a telephonic feature among a plurality of MSCs in a telephonic network including generating a message with a parameter and selectively determining whether to distribute the parameter to other mobile switch centers in the network.

The invention further provides for generating a message at the sending mobile switch center having the parameter, and selectively determining whether to distribute the parameter to a selected one of the mobile switch centers.

In another aspect of the invention a control file is established for identifying in the control file a selected one of the mobile switch centers, and excluding distribution to the selected one of the mobile switch centers of a parameter having a selected feature determined not to be distributed. A server having a master control file is provided for establishing a call processing node associated with the sending mobile switch center, and receiving at the call processing node a copy of the master control file. A copy of the master control file is downloaded from the server to a call processing node of the sending mobile switch center. A call processing node having a software program is provided for processing information associated with the master control file.

In yet another aspect of the invention the master control file and a control file copy are stored in the memory of the call processing node and updated in real time or alternatively refreshed periodically.

These and other features and advantages of the present invention will become apparent from the following detailed description, the accompanying drawings and the appended claims.

BRIEF DESCRIPTION OF THE DRAWINGS

FIG. 3 shows a flow chart in accordance with the invention.

DETAILED DESCRIPTION

Figures 1, 2:
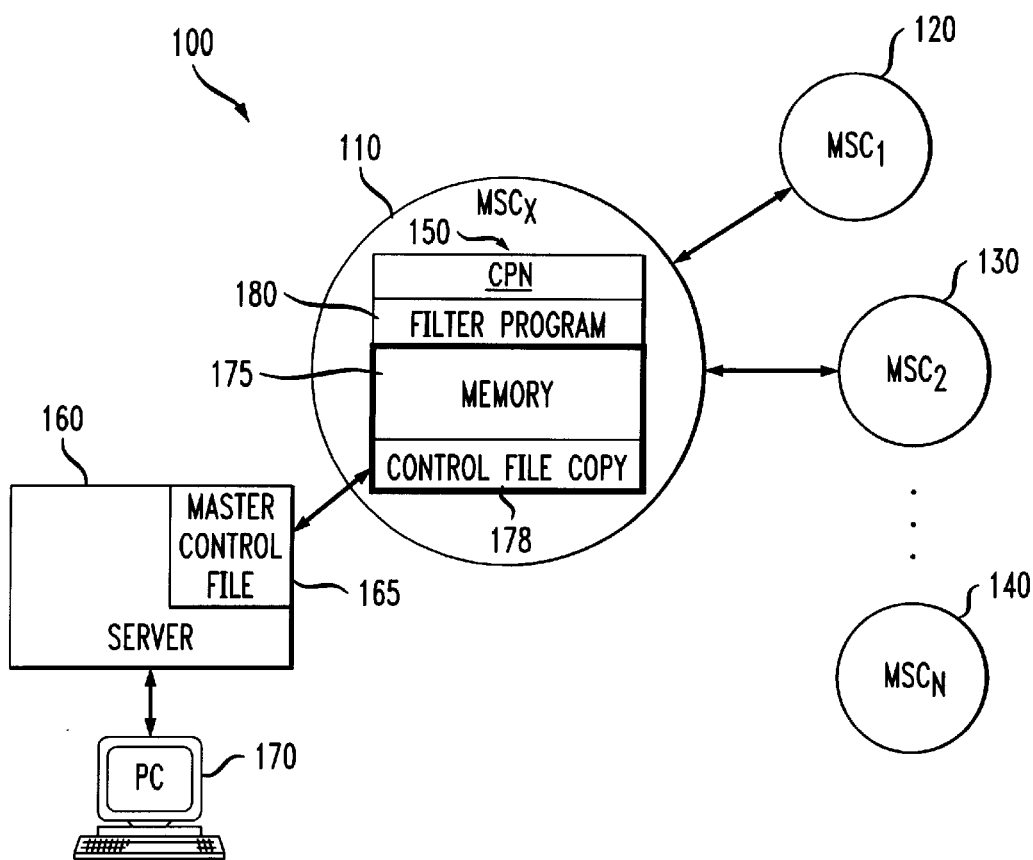
FIG. 1 shows a functional block diagram of a system in accordance with the invention.
FIG. 2 shows a table of information associated with a master control file in accordance with the invention.

A system 100 in accordance with the invention is shown in FIG. 1. The system 100 includes a plurality of nodes or mobile switch centers MSCs, MSCx 110, MSC1 120, MSC2 130, and MSCn 140 in a wireless telephonic the ANSI41 standard. In practice, the system 100 operates in a telephonic network with a large number of mobile switch centers operated by many different providers or vendors. The system 100 in accordance with the invention operates in a range of telephonic networks. The range includes a telephonic network in a limited geographical area, such as a metropolitan area, and a telephonic network transversing international boundaries.

In the operation of the system 100, messages in accordance with the ANSI41 Standard are generated and transmitted among the MSCs, for example from a sending MSCx to remote MSC1, MSC2 . . . MSCn. The messages include preferably optional parameters to define telephonic features included with the parameter.

As previously explained, some MSCs are not able to process all parameters in messages and thus do not comply with the ANSI41 standard. New features introduced are defined by parameters in messages. The new features are frequently introduced in a competitive business climate, and accordingly, vendors desire to introduce new features as soon as possible even though not all MSCs are able to process parameters that correspond to the new features. When an operation/call having a parameter associated with a new feature arrives at a non-complying MSC degradation of the call processing sometimes occurs including the failure to establish a call.

Referring to FIG. 1, the MSCx 110 has a call processing node (CPN) 150 which generates and transmits messages from the sending MSCx 110 to the other remote MSCs in the telephonic network. A server 160 interfaces with the call processing node 150 contained in the MSCx 110. The server 160 has a master control file 165. A PC 170 having connections with the server 160 performs operations on the master control file 165.

The call processing node 150 includes a memory 175 for storing a control file copy 178 of the master control file 165. The control file copy 178 is a replica of the master control file 165 and is downloaded to the memory 175 via instructions from the PC 170. The call processing node 150 includes a filter program 180 that processes data associated with the control file copy 178 in the memory 175 so that a message generated and transmitted by the call processing node 150 does not include a parameter that will be rejected by a non-complying MSC.

FIG. 2 shows data associated with the master control file 165, which is the same as the control file copy 178 downloaded in the memory 175. Column 181 identifies a specific parameter I.D. represented by X, Y and Z. Column 182 indicates the specific instructions, send or do not send the parameter, and column 183 indicates which mobile switch centers (MSCs) are to be excluded from receiving the parameter.

For example, for parameter X all mobile switching centers (MSCs) are excluded from receiving the parameter. For parameter Y, mobile switching centers (MSCs) A, C, D and E are excluded from receiving parameter Y. A similar analysis follows for parameter Z where mobile switch centers (MSCs) D, E, F and G are excluded from receiving the parameter. Moreover, if a parameter does not exist in the control file copy 175, then the parameter is preferably sent to all MSCs.

In accordance with an embodiment of the invention, the control file copy 178 in the memory of 175 of the call processing node 150 is periodically refreshed with the copy of the master control file 165, which from time to time is updated via the PC 170.

Alternatively, real time update of the control file copy 178 is provided. Upon instructions initiated at the PC 170, the master control file 165 is updated and the server 160 downloads a control file copy 178 to the memory 175 of the call processing node 150.

In the operation of the invention, when a call transmission failure occurs because an MSC erroneously rejects a message because a parameter is associated with a feature not processed by the MSC, the failure is corrected in real time by:

1. Modifying the master control file 165 to filter the parameter for an identified non-complying MSC; and then 2. Downloading of the control file 178 to the sending MSCx 110 to provide the sending MSCx 110 with the updated information identifying the parameter that will not be transmitted to the non-complying MSC because the parameter includes a feature that is erroneously rejected by the non-complying MSC, and 3. Coupling the filter program 180 with the sending MSCx 110 to filter a parameter unacceptable to a receiving non-complying MSC so that the receiving non-complying MSC provides the acceptable level of service to the message in the absence of the unacceptable parameter introduced to the telephonic network and transmitted to the non-complying MSC.

Accordingly, an otherwise service affecting outage is rectified instantaneously without having to effect a software change in any network MSC.

If sending and receiving MSCs are owned by different providers or vendors, the owner of the sending MSC in current practice has the ability to charge the owner of the receiving non-complying MSC to correct the receiving MSC's inability to handle the new parameter by excluding the transmission of the unaccepted parameter to the non-complying receiving MSC. Thus the invention provides a revenue opportunity for the vendor of the sending MSC.

The operation of the invention allows software supporting features or services to be deployed in advance of the ability or capacity of all MSCs in the telephonic network to accept and process a parameter including a new feature or to provide support for updated and revised capability rules. This result is achieved by encoding the master control file 165 and downloading the encoding information to control file copy 178. The filter program then prevents the sending of such parameters to all MSCs. When a receiving MSC becomes software ready, the encoding information is updated in the master control file 165 and control file copy 178, and the software ready MSC is deleted from the excluded destinations. Accordingly, the filter program 180 allows the transmission of the parameter to the software ready MSC. This is accomplished without having to deploy the sending MSC's software enhancements in a phased approach. Rather, the master control file 165 is updated to reflect the software ready status of the MSCs in the telephonic network.

FIG. 3 shows a flowchart in accordance with the invention for the filter program 180. The method starts at step 200. Then at step 210 a message with parameter X, for example, is generated. At step 220, it is determined if parameter X is in the control file copy 178. If not, the method proceeds to step 240 and the message is sent and the method ends at step 250. If yes, the method proceeds to step 230 where the MSC destination is determined. After step 230, the method proceeds to step 260 where it is determined if the MSC destination is in the file for that parameter. If the MSC destination is in the file, then the method proceeds to step 270 and the parameter is not sent, and the method then ends at step 280. If the MSC destination is not in the file for that parameter, the method proceeds to step 240 and the message is sent. The method then ends at step 250.

Those skilled in the art having the benefit of the present disclosure will appreciate that the present invention may take many forms and embodiments. Some embodiments have been presented and described so as to give an understanding of the invention. It is intended that these embodiments should be illustrative, and not limiting of the present invention. Rather, it is intended that the invention cover all modifications, equivalents and alternatives falling within the spirit and scope of the invention as defined by the appended claims.

What is claimed is:

1. A method of communicating between a sending mobile switching center and a plurality of receiving mobile switching centers with different feature capabilities, comprising the steps of:

determining with respect to one feature of the different feature capabilities which of the plurality of receiving mobile switching centers lack capability of processing standard messages with a message parameter associated with the one feature;

selectively excluding the message parameter from messages sent by the sending mobile switching center to the noncompliant receiving mobile switching centers that lack the capability to process messages with the message parameter associated with the one feature.

2. The method of claim 1 in which the step of determining includes the steps
ascertaining an identity of one of the receiving mobile switching centers to which a message with the parameter is to be sent, and
comparing the identity with a plurality of identities of noncompliant mobile switching centers stored in a noncompliant feature control file that lack the capablity to process messages with the message parameter associated with the feature.

3. The method of claim 2 in which the step of determining includes the steps
storing the noncompliant feature master control file at a message parameter control server, and
interfacing the noncompliant feature control file with the sending mobile switching center to download the noncompliant feature master control file to a noncompliant feature control file copy memory for storage at the sending mobile switching center.

4. The method of claim 3 in which the step of comparing is performed by comparing the identity of the one receiving mobile switching center to which the message is being sent with the plurality of identities stored in the noncompliant feature control file copy memory after being downloaded from the message parameter control server.

5. The method of claim 4 including the step of downloading the noncompliant feature master control file to update the noncompliant featured control file copy memory at the sending mobile switching center.

6. The method of claim 5 in which the step of downloading is performed periodically.

7. The method of claim 5 in which the step of downloading is performed on a real time basis during the processing of a call through the sending mobile switching center.

8. The method of claim 3 including the step of interfacing include the step of controlling the message parameter control server from a personal computer to download the noncompliant feature master control file to the sending mobile switching center.

9. A method for distributing a parameter from a sending mobile switch center to one of a plurality of remote mobile switch centers, the method comprising the steps of:
generating a message at the sending mobile switch center having the parameter; associating a selected feature with the parameter; and
excluding distribution of the parameter having the selected feature to the one of the remote mobile switch centers.

10. The method of claim 9 including the steps of
receiving the parameter at a call processing node in the sending mobile switch center,
and wherein the call processing node includes a memory and a filter program for processing data associated with the memory, and
generating at the call processing node the message that excludes distribution of the parameter to the one of the remote mobile switch centers.

11. The method of claim 10 including the step of identifying in a memory control file in the memory the parameter excluded from distribution to the one of the remote mobile switch centers.

12. The method of claim 11 including the steps of
identifying in a server a master control file having data including the identity of the parameter and the one of the plurality of remote mobile switch centers, and selectively downloading the data of the master control file to the control file copy.

13. A system for distributing a parameter from a sending mobile switch center to one of a plurality of remote mobile switch centers, the system comprising:
means for generating a message at the sending mobile switch center having the parameter;
means for associating a selected feature with the parameter; and
means for excluding distribution of the parameter having the selected feature to the one of the remote mobile switch centers.

14. The system of claim 13 including
means for receiving the parameter at a call processing node in the sending mobile switch center,
and wherein the call processing node includes a memory and a filter program for processing data associated with the memory, and
means for generating at the call processing node the message that excludes distribution of the parameter to the one of the remote mobile switch centers.

15. The system of claim 14 including means for identifying in a memory control file in the memory the parameter excluded from distribution to the one of the remote mobile switch centers.

16. The system of claim 15 including
means for identifying in a server a master control file having data including the identity of the parameter and the one of the plurality of remote mobile switch centers, and
means for selectively downloading the data of the master control file to the control file copy.

17. The system of claim 15 including means for updating the data in the master control file.

18. A system for distributing a parameter from a sending mobile switch center to one of a plurality of remote mobile switch centers, the system comprising:
a call processing node for generating a message at the sending mobile switch center having the parameter; and
a filter program for associating a selected feature with the parameter and excluding distribution of the parameter having the selected feature to the one of the remote mobile switch centers.

19. The system of claim 18 wherein the call processing node includes
a memory having a control file copy identifying the parameter excluded from distribution to the one of the remote mobile switch centers.

20. The system of claim 19 including a server having a master control file having data including the identity of the parameter and the one of the plurality of remote mobile switch centers and connected to the memory for downloading the data of the master control file to the control file copy.

21. The system of claim 20 including a personal computer connected to the server for selectively changing the identity of the parameter.

22. The system of claim 20 including a personal computer connected to the server for selectively changing the identity of the one of the plurality of mobile switch centers.

* * * * *